United States Patent
Grassi et al.

(10) Patent No.: US 7,518,355 B2
(45) Date of Patent: Apr. 14, 2009

(54) PACKAGE LEVEL VOLTAGE SENSING OF A POWER GATED DIE

(75) Inventors: Michael Grassi, Sammamish, WA (US); Alex Levin, Tacoma, WA (US); John Dickerson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 11/694,424

(22) Filed: Mar. 30, 2007

(65) Prior Publication Data

US 2008/0238407 A1    Oct. 2, 2008

(51) Int. Cl.
*G01R 31/28* (2006.01)
*G01R 31/26* (2006.01)

(52) U.S. Cl. .................... 324/158.1; 324/765

(58) Field of Classification Search .......... 324/158.1, 324/755, 763, 765
See application file for complete search history.

(56) References Cited

U.S. PATENT DOCUMENTS

| 6,417,680 | B1 * | 7/2002 | Birdsley et al. ............. 324/752 |
| 6,483,327 | B1 * | 11/2002 | Bruce et al. ................. 324/752 |
| 6,614,251 | B2 * | 9/2003 | Ootsuji ....................... 324/765 |
| 6,914,447 | B2 * | 7/2005 | Baumann ..................... 324/765 |
| 7,081,635 | B2 * | 7/2006 | Baumann ................. 250/493.1 |
| 7,211,995 | B2 * | 5/2007 | Ventomaki ............... 324/158.1 |
| 7,394,273 | B2 * | 7/2008 | Hsu et al. ................... 324/763 |

* cited by examiner

*Primary Examiner*—Ha Tran T Nguyen
*Assistant Examiner*—Joshua Benitez
(74) *Attorney, Agent, or Firm*—Grossman, Tucker, Perreault & Pfleger, PLLC

(57) ABSTRACT

A system and method for voltage sensing at active power gated cores of a multi core CPU wherein a Controlled Collapse Chip Carrier bump in a gating region for an associated core is isolatable from an ungated power region by a power gate to allow voltage sensing at a designated location with substantially no current passing there through.

11 Claims, 5 Drawing Sheets

PACKAGE LEVEL VOLTAGE SENSING OF A POWER GATED DIE

FIELD

The present disclosure is related to voltage sensing and regulation in power gated CPU's. More specifically, a system and method for voltage sensing at the active power gated CPU cores is disclosed.

BACKGROUND

Voltage sensing and regulation become more complicated in a gated system. Power gating effectively closes off the leakage current path for CPU cores which are not active. In a power gated configuration, current travels into the CPU silicon at the power gate Controlled Collapse Chip Connection bumps (C4 bumps) on the ungated side, through power gating transistors, and into a gated power domain on the chip and package substrate. If the core's power gates are on, a conducting path exists between the ungated voltage domain and the gated domain. If the power gates are off, the gated CPU is isolated from the ungated supply.

Multi core systems make use of power gating to reduce leakage power on inactive cores, and utilize that power for faster and more efficient operation of the active cores. Any core may go into an inactive state and be gated, in which its voltage supply is cut off by the power gates, and the on core voltage will decay to 0V. In that state, the remaining active cores must be supplied with an appropriate voltage level.

Voltage sensing may be conducted through on die structures located in a variety of locations throughout the cores. An integrated on die regulator senses these locations and uses a digital algorithm to determine the correct regulation voltage. Power gating does not present a problem for this configuration, since the on die voltage regulator controller is able to logically determine the voltages to sense and those to ignore if power gating is enabled for some of the cores.

However, in most instances external VR11 operation may be desired. In this case, a voltage sense line from the die is routed to the regulator to monitor the voltage and use it for regulatory feedback. Complications arise when the voltage at any gated core could fall to 0V, while other cores need a stable voltage supply. The voltage regulator needs to somehow ignore the voltage at cores with power gates turned off, while continuing to monitor and adjust to voltage changes at the active cores.

Sensing the voltage upstream in the package ungated region is undesirable because the gated voltage is separated from this domain by package power routing, the power gates themselves, and any other parasitic impedance between the power gates and the core transistors. These series elements in the power path could account for up to 20-30 mV of voltage difference between the regulation point and the true core voltage. The loss in sensing accuracy of 2-4 MHz per mV is a problem which calls for an as yet unavailable means for voltage sensing at each core, which is able to comprehend the gating states to disable sensing at the gated cores.

Although the following Detailed Description will proceed with reference being made to these illustrative embodiments, many alternatives, modifications, and variations thereof will be apparent to those skilled in the art. Accordingly, it is intended that the claimed subject matter be viewed broadly.

DETAILED DESCRIPTION

Figure 1:
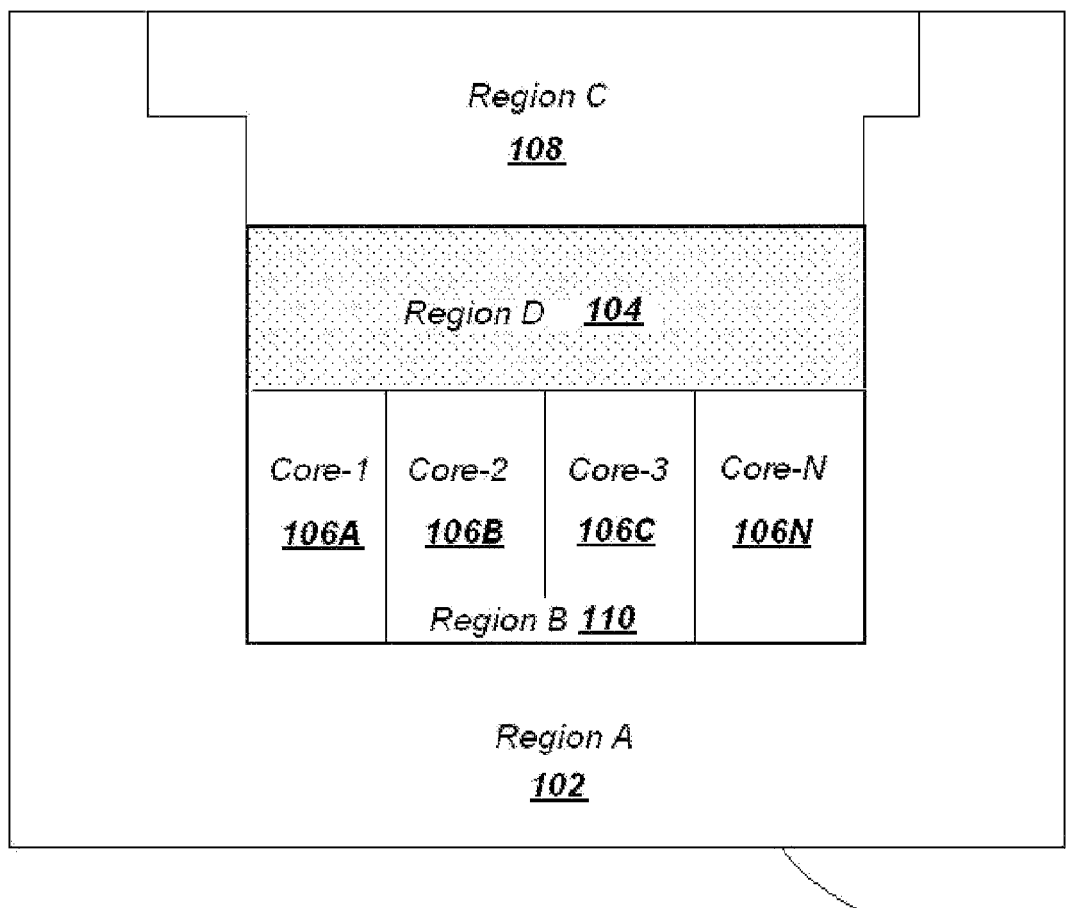
FIG. 1 is a schematic representation of the voltage domains on package and silicon for a typical power gated system according to the disclosure.

The disclosure of FIGS. 1 through 5 provides a power gated system 100 and method, with only a package substrate change, to enable voltage sensing at a point 162 in the active CPU cores for providing correct voltage regulation. Referring to FIG. 1, Region A is the package substrate 102. Region B is the Silicon Footprint 110 for a CPU having N cores, including Core-1 106A, Core-2 106B, Core-3 106C and so on, through Core-N 106N. Region C is the ungated power region 108, and Region D is the power gating region 104 for the CPU. In order to sense the voltages of the active cores of 106A-106N and average them to provide an accurate regulation voltage, the power gates of Region D may be used along with a 'wired OR' in the package.

Figure 2:
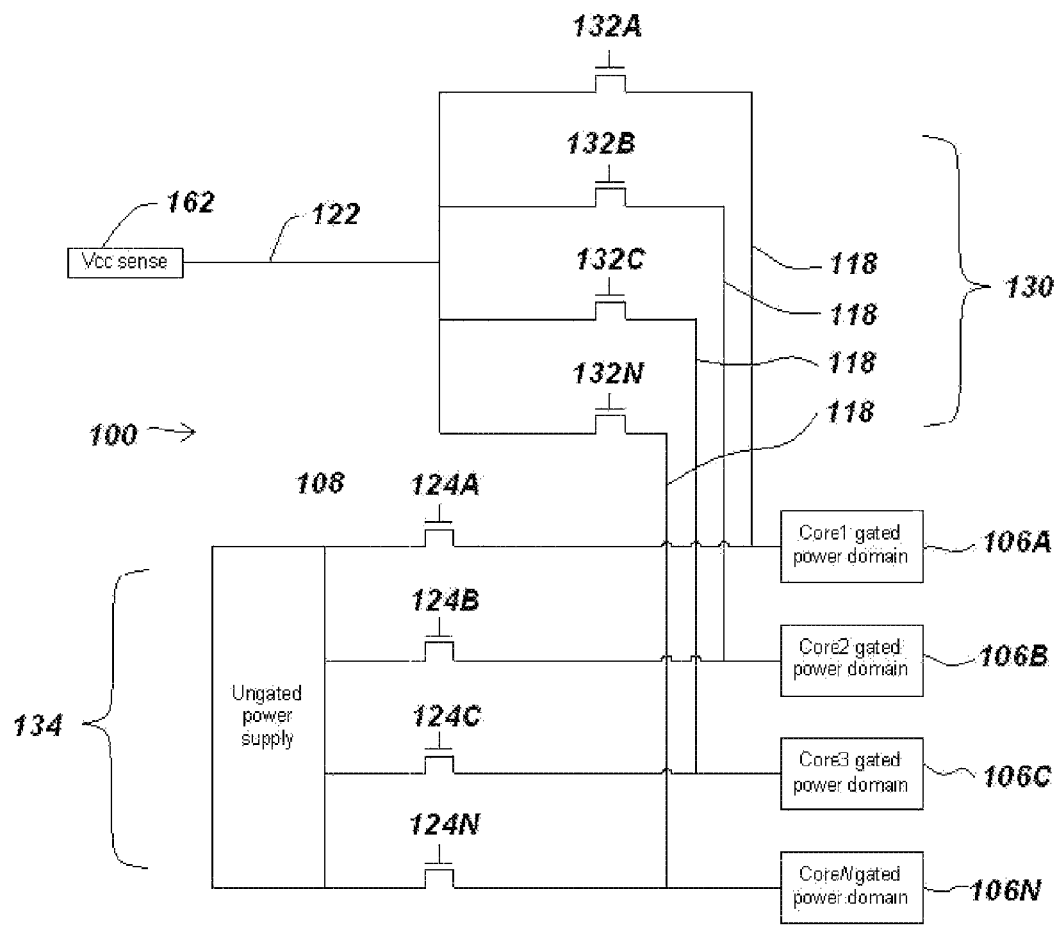
FIG. 2 is a circuit diagram of a power supply pathway and sensing network for a power gated system according to the disclosure using an off die voltage regulator controller.
Figure 3:
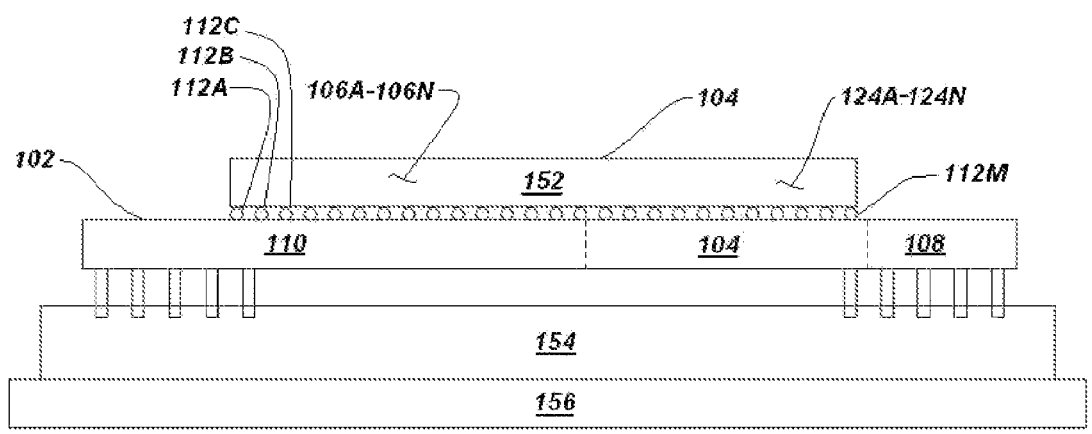
FIG. 3 is a side view of a CPU mounting assembly according to the disclosure.
Figure 4:
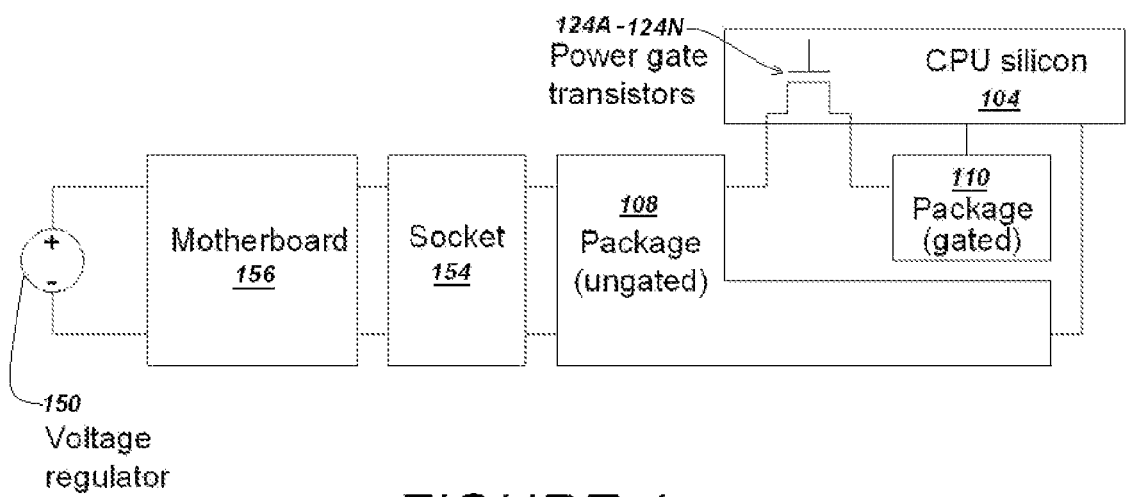
FIG. 4 is a power flow block diagram for the CPU of FIG. 3.

FIG. 2 shows the schematic for the sensing circuit 130, along with the standard core current pathway 134 through the power gates 124A to 124N. FIG. 3 shows the mounting of CPU 152 of the disclosure to a typical CPU socket 154 of a typical motherboard 156. The power gates 124A-124N are shown as single devices for each gated power domain 110, but are actually parallel sets of hundreds of devices to provide low resistance to current traveling through them. Current from the platform voltage regulator 150 enters the CPU silicon 152 through the ungated power supply section 108.

Depending on the activity state of the cores 106A through 106D in the CPU, all, some, or none of the power gating transistors 124A to 124D will be in an on state and conducting current. For those power gates 124A to 124D that are conducting, current will flow through the power gate transistors in region 104, and into the gated regions 106A to 106D to power the transistors on the chip. If a power gate 124A for a core is on, the gated power domain 106A must be regulated to a specified voltage to ensure functionality of the core. If a power gate 124N is off, its corresponding gated power domain will fall to zero volts. Power gates which are in the on state may observe and regulate the voltage of the cores which are active. If a power gate is off, its power domain may be ignored, since a zero voltage may corrupt the correct sensing voltage for regulation.

Figure 5:
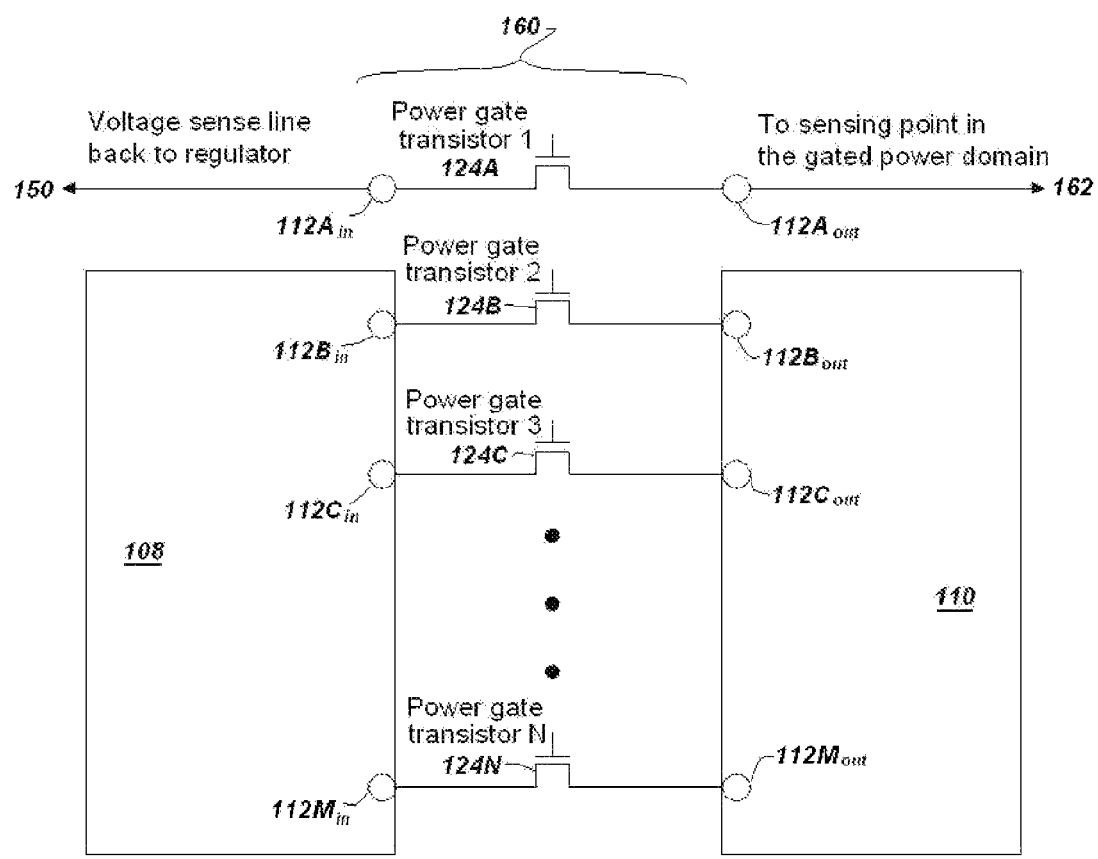
FIG. 5 is a diagram of the power gate transistors for the CPU of FIG. 3, having one pair of C4 bumps isolated for voltage sensing.

FIG. 5 shows the isolation of one C4 bump pair (112Ain/112Aout) for voltage sensing, in the power gating of the disclosed CPU 152 of M bump pairs, 112A through 112M. Current enters the bump pairs 112 from ungated power region 108 region and exits though gated region 110. To ensure that only the gated power domains in the on state are sensed, and to maintain design simplicity, one power gate 124A per core may be allocated, or "sacrificed", to a sensing pathway 160. The power gates 124A to 124N are groupings of many parallel transistors that operate in unison. In the Bloomfield CPU design, there are approximately 150 individual pathways making up each power gate transistor represented in 124A to 124N. By isolating one power gating transistor 124A from each group of 124A to 124N, and routing a sense line 160 through it, the problem of sensing only on state gated power domains is solved. If the power gate 124A is turned off, the sensing voltage does not pass through the power gate. If the power gate 124A is turned on, it passes the correct voltage from the gated power domain through the power gate.

A single C4 bump 112A in the ungated region 108 and a single C4 bump 112A in the gated region 110 for each core are sacrificed for voltage sensing and are designated as the voltage sense bump pair 112A. The designated sense bump pair is no longer available as a current providing pathway, and is isolated from the ungated power region 108 in the package 152 and on silicon power bussing. Substrate level isolation allows the bump voltage at pair 112A to be observed with no significant current passing through it. With no substantial current passing through bump pair 112A and its associated power gating transistor 124A, the true core voltage is observable at the sensing point 162 of system 100.

Depending on design requirements, the voltage sensing point may be at C4 bump 112A, or more commonly at an alternate location in the gated region 110 connected to C4 bump 112A through a trace. Package traces 118 are routed from each of the designated sensing bumps 112A for each core to a central point 162 in the package gating region 110, and out of the package/socket through a merged trace 122. The merging of the traces provides an adequate averaging function, so that the average voltage of active cores is observed. By averaging through merging, the regulation voltage will be appropriate for the loaded core and the unloaded core. The merged trace is routed to a high impedance amplifier input contained in voltage regulator 150. The high impedance input implies that no significant current will flow through the sense line.

When one or more of the power gates 124A through 124N turn off to isolate an inactive core, co-functioning sacrificial gates 132A through 132N simultaneously cut off the sense bump voltage connection into the inactive core. This provides that only the active cores are monitored for voltage regulation. Sacrificing a single pair of C4 power bumps and converting them to dedicated sense bumps eliminates the need for added die complexity to facilitate the voltage sensing on gated/ungated cores.

Design simplicity is a key benefit of this invention. The necessary structures already exist on the power gated die to provide this capability. The package substrate is the simplest element to change in order to enable the off chip sensing capability. The sacrifice of the one C4 bump 112 for sensing in a 4-core package only reduces that path width by 0.6%, which is acceptable.

Providing a unified sensing mechanism at the socket level allows a well established and trusted voltage regulation technologies, such as VR11 to support the CPU. Otherwise, a typical on die regulator controller may be used for validation. But, when such an on die controller is nonfunctional or less than fully functional, the validation of the entire CPU may be at risk.

By implementing this simple package change, the system designer is able to regulate to the correct core voltage, and is freed from a requirement to determine the activity states of each core.

It should be understood that the above disclosures are merely representative and that there are many possible embodiments for the present invention, and that the scope of the invention should only be limited according to the following claims made thereto.

What is claimed is:

1. A method for voltage sensing at active power gated cores of a multi core CPU comprising:

selectively providing power to each one of said plurality of cores through a plurality of controlled collapse chip connection (C4) bumps in a gated power region, each of said plurality of C4 bumps each configured to couple one of a plurality of power gates to an ungated power region; and providing a voltage sensing bump coupled to said ungated power region in an OR arrangement with said plurality of power gates for each of said plurality of cores, wherein said voltage sensing bump is configured to provide a signal representative of current to each one of said plurality of cores only when at least one of said power gates is in an ON position.

2. The method of claim 1 further comprising:

routing package traces from said voltage sensing bump of each of said plurality of cores to a common node in said ungated power region; and providing a merged trace coupled to said common node to provide said signal representative of an average voltage of said active power gated cores of said multi core CPU.

3. The method of claim 2, wherein said merged trace is coupled to a high impedance amplifier input of a voltage regulator.

4. The method of claim 3, further comprising:

turning off a gate coupled to said voltage sensing bump to isolate one of said plurality of cores when said one of said plurality of cores is inactive.

5. A system comprising:

a multi-core CPU having a plurality of cores each configured to be selectively activate or inactive;

a packaging substrate configured to be coupled to each of said plurality of cores, wherein for each one of said plurality of cores, said packaging substrate comprises an ungated power region configured to provide a substantially constant supply of power and a gated power region comprising a plurality of controlled collapse chip connection (C4) bumps, wherein said plurality of C4 bumps comprises:

a first set of C4 bumps each configured to couple one of a plurality of power gates to said ungated power region to selectively provide power to said one of said plurality of cores when in an ON position; and a voltage sensing bump coupled to said ungated power region in an OR arrangement with said plurality of power gates, wherein said voltage sensing bump is configured to provide a signal representative of current to said one of said plurality of cores only when at least one of said first set of power gates is in said ON position.

6. The system of claim 5 further comprising package traces routed from each of said voltage sensing bump to a common node in said ungated power region and a merged trace extending from said common node to obtain said signal representative of an average voltage for said multi-core CPU.

7. The system of claim 6 wherein said merged trace is coupled a high impedance amplifier input contained in a voltage regulator.

8. The system of claim 5, wherein said voltage sensing bump is isolated from said ungated power region.

9. An apparatus comprising:

a packaging substrate configured to be coupled to each of a plurality of cores of multi-core CPU, wherein for each one of said plurality of cores, said packaging substrate comprises an ungated power region configured to provide a substantially constant supply of power and a gated power region comprising a plurality of controlled collapse chip connection (C4) bumps, wherein said plurality of C4 bumps comprises:
a first set of C4 bumps each configured to couple one of a plurality of power gates to said ungated power region to selectively provide power to said one of said plurality of cores when in an ON position; and
a voltage sensing bump coupled to said ungated power region in an OR arrangement with said plurality of power gates, wherein said voltage sensing bump is configured to provide a signal representative of current to said one of said plurality of cores only when at least one of said first set of power gates is in said ON position.

10. The apparatus of claim 9, wherein said voltage sensing bump is isolated from said ungated power region.

11. The method of claim 1, further comprises isolating each voltage sensing bump from said ungated power region.

* * * * *